Oct. 9, 1945.     R. M. DOUGLAS ET AL     2,386,668

PISTON

Filed July 10, 1942      2 Sheets-Sheet 1

INVENTORS
RAYMOND M. DOUGLAS
RALPH S. HUYCK
BY
ATTORNEY

Oct. 9, 1945. R. M. DOUGLAS ET AL 2,386,668
PISTON
Filed July 10, 1942 2 Sheets-Sheet 2

INVENTORS
RAYMOND M. DOUGLAS
RALPH S. HUYCK
BY H.O. Clayton
ATTORNEY

Patented Oct. 9, 1945

2,386,668

UNITED STATES PATENT OFFICE 2,386,668

PISTON

Raymond M. Douglas, Alpena, Mich., and Ralph S. Huyck, South Bend, Ind., assignors to Bendix Aviation Corporation, South Bend, Ind., a corporation of Delaware Application July 10, 1942, Serial No. 450,376

11 Claims. (Cl. 309—4)

This invention relates in general to motors, and more particularly to the piston or so-called power element of a pressure differential operated motor. When such a motor is energized the piston thereof is subjected to a differential of pressures resulting in a movement of the piston to actuate the mechanism to which the piston is connected. It is of course desirable that the piston be of light weight and of relatively few parts. It is, however, particularly desirable that there be no leakage of power fluid from one compartment of a double-ended motor to the other compartment or into or from the compartment of a single acting motor. In other words, there should be a fluid-tight seal between the inner wall of the cylinder of the motor and the periphery of the piston. Accordingly, the principal object of our invention is to provide a simple, durable and inexpensive piston construction effective to prevent the passage of air or other power fluid between the periphery of the piston and the cylinder wall and of such construction as to require a minimum of service for a long period of time.

A further object of the invention is to provide a one-piece piston of but two materials, a synthetic compound and a metal, the metal constituting the disk or body portion of the piston and the synthetic material, which is bonded to the body portion, constituting the peripheral element of the piston.

Another object of our invention is to provide, in a motor having a follow-up valve therein, a piston requiring but a minimum of force to move the same within the casing of the motor, said piston being connected to one of the parts of the valve.

Figure 1:
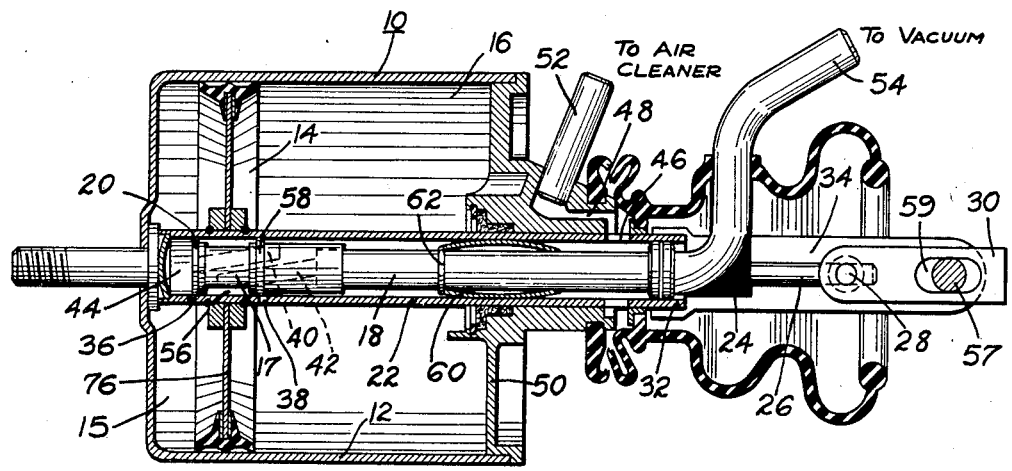
Figure 9:
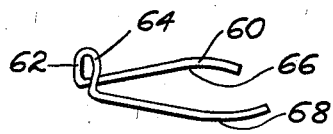

Other objects of the invention and desirable details of construction of parts will become apparent from the following detailed description of certain embodiments of the invention, taken in conjunction with the accompanying drawings illustrating said embodiments, in which:

Figure 1 is a longitudinal sectional view of the servo-motor; Figures 2 to 8 inclusive are sectional views of a detail of the piston structure, Figures 1 to 6 inclusive and Figure 8 being modifications of the preferred embodiment of our invention disclosed in Figure 7. Figure 9 is a perspective view of one of the elements of the servomotor.

Referring now to Figure 1 disclosing the piston constituting the preferred embodiment of our invention, a double-acting, double-ended motor 10 includes a casing 12, which houses a reciprocable piston 14. The casing and piston together provide compartments 15 and 16 and it is the gaseous pressure within said compartments that effects the operation of the motor. The operation of the motor, that is the influx and efflux of air or other power fluid into or from the compartments 15 and 16 is controlled by a so-called follow-up valve mechanism comprising a spool-shaped member 17 mounted on the end of a hollow valve operating rod 18 and the end portion 20 of a hollow connecting rod 22. The rod 18 is preferably welded at 24 to a link 26 adjustably connected at 28 to a manually operated link 30 and the rod 22 is connected at 32 to a link 34 connected to the mechanism to be actuated. The valve member 20 is provided with ports 36 and 38 and the valve member 17 is provided with diagonally extending ducts 40 and 42. No claim is made to the valve mechanism disclosed inasmuch as said mechanism is described and claimed in United States Patent Number 2,212,955.

When the valve members are in the position disclosed in Figure 1 the motor is said to be deenergized, for at that time both compartments 15 and 16 are vented to the atmosphere. Compartment 15 is vented via port 36, a compartment 44 in the end of the rod 22, duct 40 in the valve member 17, the hollow connecting rod 22, a port 46 in the rod 22, a duct 48 in a cylindrical end plate 50 and a nipple 52. To the nipple 52 there is connected an air cleaner not shown. The compartment 16 is vented to the atmosphere via port 38, the hollow connecting rod 22, port 46, duct 48, nipple 52 and the air cleaner.

In order to energize the motor, that is effect a movement of its piston, the spool-shaped valve member 17 is moved either to the right or left, Figure 1, said movement being effected by the manual operation of the link 30. If the movement is to the right, one end of the member 17 moves across the port 38 thereby placing the duct 42 in fluid transmitting connection with the compartment 16, the duct 42 opens into the hollow rod 18 to which is connected a conduit 54 leading to a source of vacuum such as the intake manifold of an internal combustion engine; accordingly, when the valve member 17 is moved to the right the compartment 16 is partially evacuated, the air from said compartment flowing through the port 38, a recess 56 in the valve member 17, duct 42, hollow rod 18 and the conduit 54.

The piston 14 is then moved to the right, for it will be remembered that the compartment 15 is at the time vented to the atmosphere. The piston is therefore subjected to a differential of pressures effecting this movement. If movement of the manually operated valve member 17 is stopped before the piston has completed its stroke, the piston will continue moving until the gaseous pressures within the compartments 15 and 16 are such as to place the system in equilibrium. Describing this operation, valve member 20 may follow up, that is move to a so-called lapped position, that is when a full-bodied end portion 58 of the valve member 17 is positioned over the port 38 to prevent a flow of air through said port; or the resistance to movement of the piston may be such as to result in a follow-up movement of the valve member 20 to again vent the compartment 16 to the atmosphere. The valve members 17 and 20 would then again be in the position disclosed in Figure 1.

Having described the operation of the motor to effect a movement of the piston 14 to the right it is not believed necessary to describe in detail the reverse operation of the motor to effect a movement of the piston to the left, for functionally these operations are identical, as will be apparent from an inspection of Figure 1, the latter operation being effected by moving the manually operated valve member 17 to the left to connect the compartment 15 with the source of vacuum.

There is thus provided a simple and compact double-acting motor controlled by a follow-up valve, said motor including one embodiment of the piston constituting our invention. The means or so-called work actuated by the pistons follows the movement of the manually operated link 30, said link being connected i. e. to a brake pedal, a clutch pedal or a selector mounted beneath the steering wheel for controlling the transmission; for after the valve is opened by moving the link 30, the piston and the mechanism connected thereto is moved and should the movement of the selector or brake pedal or clutch pedal be stopped before its movement is completed then the movement of the mechanism being operative is also stopped. Should the motor, that is the power means, fail for any reason, then the mechanism to be operated will be actuated solely by physical effort; for in such an event a pin 57 secured to the link 34 will contact one end or the other of a slot 59 in the link 30.

It is desirable to prevent relative movement of the valve members 17 and 20 which movement may be caused by jarring the motor 10 and the force transmitting mechanism connected to the valve members. It is assumed, for example, that the motor is employed to operate or aid in the operation of the transmission of an automotive vehicle. Now when the vehicle is travelling over rough ground the inertia of the linkage connected to the valve members may result in a relative movement of said members to effect an undesired opening of the valve. The motor is of course then energized resulting in an undesired movement of a shift rail of the transmission. In order to prevent this operation of the valve there is housed within the motor a bent wire member 60, one end 62 of which partially encircles the rod 18. It is bent upwardly at 64 and curved outwardly at 66 and 68. The member 60 is frictionally held in position on the rod 18, the circular shaped end 62 fitting tightly about said rod.

The curved sides 66 and 68 of the member 60 are slightly distorted when the rod 18 and head member 17 are slid within the hollow rod 22; accordingly, the sides 66 and 68 which are under tension, provide a means setting up a frictional resistance to relative movement of the rods 17 and 22. This resistance is of course overcome by the driver of the car when, in opening the valve, he moves the transmission controlling selector lever mounted adjacent the steering wheel; and this resistance is also overcome when the piston is moving to effect the above described follow-up action of the valve. Accordingly, the spring 60 serves to prevent relative movement of the valve members when the driver's hand is removed from the selector lever.

Figure 5:
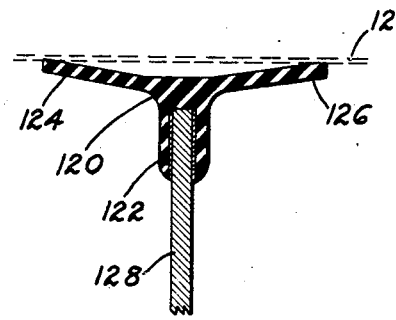
Figure 6:
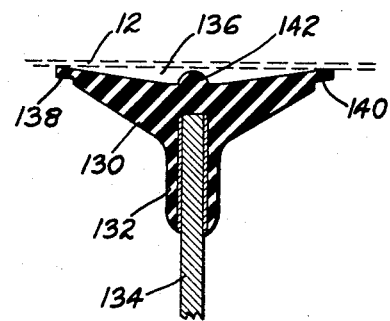
Figure 7:
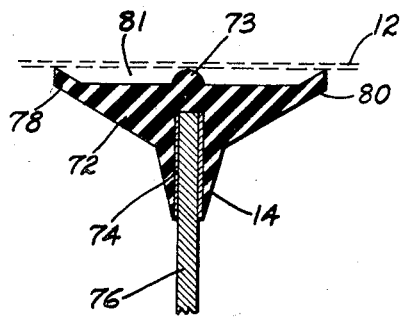
Figure 8:
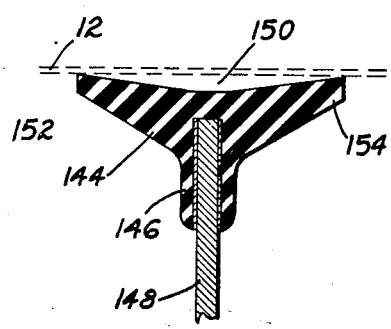

Describing now the essence of our invention there is provided in the piston 14 disclosed in Figures 1 and 7 and in the pistons disclosed in Figures 2 to 6 inclusive and Figure 8 which may be substituted for the piston 14, a simple and inexpensive element which in large measure contributes to the efficiency and effectiveness of the motor 10. Describing in detail the construction of the preferred embodiment of the piston which is disclosed in Figure 7, a peripheral ring member 72, preferably of synthetic rubber-like material, is bonded to a brass plated peripheral section 74 of a metal disk 76. The synthetic material which may be any one of buna rubber, neoprene, corprene, or perbuna, is bonded to the periphery of the disk 76, the copper crystals of the brass plating having an affinity for the synthetic material. The rubber or rubber-like synthetic material of which the member 72 is made is characterized by having a relatively high permanent set, thereby preventing a sticking of the material to the cylinder walls. This material is also so constituted as to be easily slid over the inner surface of the cylinder. However, the spring 60 prevents an untimely opening of the valve despite a low frictional resistance to movement of the piston 14.

Describing further the peripheral member or seal 72 disclosed in Figure 7 the same is substantially triangular shaped in cross section, two of the apexes of said member constituting outwardly extending flexible lips 78 and 80 which provide an effective seal against the passage of air or other power fluid between the seal and the inner surface of the motor casing 12. It will be noted that the top of the member 72 is flat except for an annular rounded projection or bead 73 in the center of said member. It is also to be noted that when the motor is deenergized, that is when both compartments 15 and 16 are vented to the atmosphere, the parts of the piston 14 assume the positions disclosed in Figure 7. The inner surface of the cylinder 12, the aforementioned flat portion of the piston and the lips 78 and 80 then outline a compartment 81. With such a structure when the compartment 16 is evacuated air will, by virtue of the shape of the lip 80, flow out of the compartment 81 into compartment 16. By virtue of the shape of both the lip 78 and the body of the seal 72 and by virtue of their flexibility said lip and that portion of the body of the seal immediately connected thereto, will be so distorted as to force the lip against the inner wall of the motor casing 12 shown by dotted lines in Figure 7; for the compartment 15 is at the time at atmospheric pressure and the compartment 81 will be partially evacuated thereby creating a differential of pressures to effect this result. And it follows that should the compartment 15 be evacuated the lip 80 will be forced against the inner wall of the motor casing. The bead 73 which is slightly spaced from the inner wall of the casing 12 when the motor is deenergized but which moves into contact with said wall when the motor is energized, serves as a means to steady and guide the piston as it moves through the cylinder.

There are disclosed, in Figures 2-6 inclusive and Figure 8 other embodiments of piston construction constituting our invention, the peripheral ring member or seal of said embodiments being made of any of the aforementioned synthetic rubber-like materials.

Figure 2:
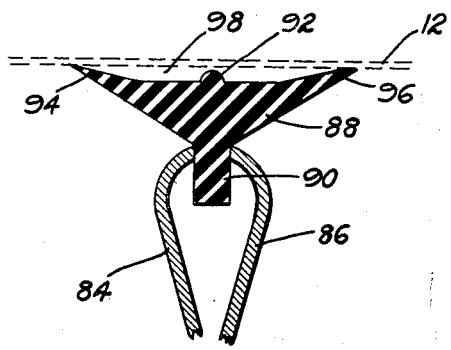

Describing the invention disclosed in Figure 2, two body plate members 84 and 86, curved outwardly adjacent their peripheries, serve to clamp in position a peripheral ring member 88 of one of the aforementioned synthetic materials. The major portion of this member is substantially triangular in cross section and a rectangular-shaped annular portion 90 of the member is clamped between the peripheral edges of the body members 84 and 86. The outer face of the ring member 88 is provided with an annular bead 92 and the face is shaped to provide lips 94 and 96 which together with the inner wall of the cylinder 12 and body of the ring member, outline a compartment 98.

Figure 3:
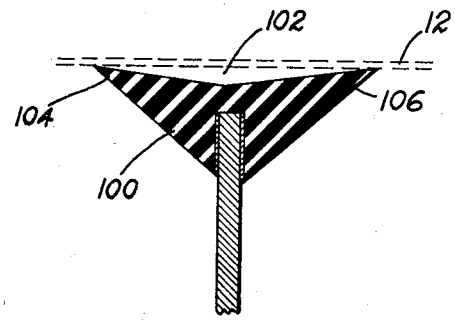

The piston constituting that embodiment of our invention disclosed in Figure 3 consists of a ring member 100 substantially triangular shaped in cross section. The outer face of said ring member is preferably so shaped that together with the inner wall of the motor casing 12 there is provided a compartment 102. As with the previously described embodiments of my invention disclosed in Figures 2 and 7 the edges of the ring member 100 constitute lips, indicated by the reference numerals 104 and 106, which function as sealing members to prevent the passage of air from one compartment of the motor to the other when the motor is energized.

Figure 4:
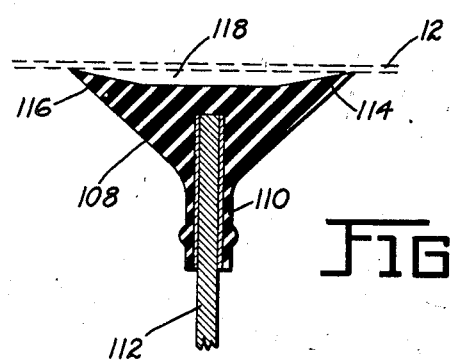

Referring now to Figure 4 there is disclosed in this embodiment of our invention a ring member 108 which is substantially triangular shaped in cross section. The inner apex of said ring member is extended to provide an annular member 110 rectangular in cross section through which extends the brass plated periphery of a disk shaped body member 112 of suitable metal such as steel. The outer face of the ring member 108 is shaped to provide lips 114 and 116 which, together with the inner surface of the motor casing 12 and the body of said member, provide a compartment 118.

The ring member 120 of the piston disclosed in Figure 5 is substantially T-shaped in cross section, the base 122 of said member, which is preferably wider than oppositely extending lip members 124 and 126, being recessed to receive the brass plated periphery of a disk shaped metal body member 128.

Those embodiments of our invention disclosed in Figures 6 and 8 include ring members which are similar in cross section to the ring member disclosed in Figure 7, the major portion of the body member being triangular shaped in cross section. Referring to the embodiment of our invention disclosed in Figure 6 a body portion 130 is extended to provide a base portion 132 which is recessed to receive the brass plated periphery of a disk shaped body member 134. The outer face of the body portion 130 is recessed to provide, together with the inner surface of the motor casing, a compartment 136 and also provide relatively thin lip members 138 and 140. An annular bead member 142 extends from one face at the center thereof.

The embodiment of our invention disclosed in Figure 8 comprises a ring member the body portion 144 of which is substantially triangular shaped in cross section. A projection 146 extending inwardly from the body portion 144 is recessed to receive the brass plated periphery of a disk shaped metal body member 148 and said body portion is recessed on its outer face to provide, together with the inner surface of the motor casing 12, a compartment 150. The upper edges or apexes of the body portion 144 provide lips 152 and 154.

There is thus provided in the seven embodiments of our invention disclosed in the drawings one-piece motor pistons simple in construction, light in weight and each is effective serving as the power element of the motor. The construction of said pistons is such as to prevent the flow of air or other power fluid from one compartment of the motor to the other when the latter is being energized. Each of the pistons disclosed in the drawings cooperates well with the remainder of the mechanism of the motor disclosed in Figure 1, for by virtue of their weight and construction but little force is necessary to move said pistons and they provide an effective seal to prevent leakage of air from one motor compartment to the other when the motor is energized.

This application constitutes a continuation-in-part of our application Serial No. 347,588 filed July 26, 1940. The latter application has now matured into Patent No. 2,294,331 dated August 25, 1942.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. A piston adapted for use in a pressure differential operated double-acting motor consisting of a disk shaped metal plate serving as a body member, said member having its surface brass plated adjacent its periphery, and a peripheral seal member of synthetic rubber chemically bonded to the brass plated area of the body member.

2. A piston for use in a fluid motor comprising a disk-like body member of metal and a one piece peripheral seal member of synthetic rubber-like material chemically bonded to the periphery of said metal body member.

3. A piston adapted to be used in a pressure differential operated motor, said piston comprising a relatively thin metal body member circular in outline and further comprising a multisided seal member of synthetic rubber chemically bonded to the periphery of said body member.

4. In a fluid pressure operated motor, a piston comprising a metal disk shaped body member and a sealing ring of synthetic rubber chemically bonded to the periphery of the body member, said ring being substantially triangular in cross section thereby providing two lip members and having one of its sides so recessed as to provide, together with the inner wall of the cylinder of the motor, an annular pocket substantially triangular in outline.

5. A piston comprising a metal disk shaped body member and a ring of synthetic rubber permanently secured to the periphery of said body member, the major portion of said ring being substantially triangular shaped in cross section and the remainder of said ring constituting a projection, substantially rectangular in cross section, extending from one of the apexes of said triangular shaped body portion.

6. A motor piston comprising a disk shaped body member of metal and a flexible ring of synthetic rubber chemically bonded to the periphery of said member, said ring being substantially T-shaped in cross section, the base or inner portion thereof being recessed to receive the periphery of the body member.

7. In a double-acting double-ended pressure differential operated motor a piston comprising a disk shaped body member of metal and a flexible annulus of synthetic rubber chemically bonded to the periphery of said member, said annulus being substantially triangular shaped in cross section, its outer face being so recessed as to provide two lip members one or the other of which is bent, when the motor is energized, to provide a seal and prevent a flow of air from one compartment of the motor to the other.

8. In a double-ended double-acting pressure differential actuated motor, a piston comprising a disk shaped body member of metal and a flexible ring of synthetic rubber bonded to the periphery of said member, said ring being substantially T-shaped in cross section, its outer face being so shaped as to provide, in combination with the inner surface of the casing of the motor, a compartment which is substantially triangular shaped in cross section and an annular bead having a rounded outer surface extending outwardly from the center portion of said outer surface.

9. In a double-acting double-ended pressure differential actuated motor, a piston comprising a flexible ring of synthetic rubber substantially triangular shaped in cross section the outer face of said ring being recessed and the inner portion thereof being provided with an annular member substantially rectangular shaped in cross section, together with a body member of metal consisting of two disk shaped members each being cupped at its outer periphery to house and secure therebetween the aforementioned annular member.

10. As a new article of manufacture, a packing member and support therefor, which includes a circular flat relatively stiff single disc of sheet stock, and a single packing ring of flexible rubberlike material extending about the disc edge and permanently secured thereto, the difference between outer and inner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges.

11. As a new article of manufacture, a packing member and support therefor, which includes a circular flat relatively stiff single disc of sheet stock, and a single packing ring of flexible rubberlike material extending about the disc edge and permanently secured thereto, the opposed faces of said disc and said packing ring including interpenetrating portions, the difference between outer and inner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges.

RAYMOND M. DOUGLAS.
RALPH S. HUYCK.